UNITED STATES PATENT OFFICE.

JEAN V. SKOGLUND, OF BAYONNE, NEW JERSEY.

SALT MIXTURE FOR EXPLOSIVES.

SPECIFICATION forming part of Letters Patent No. 673,328, dated April 30, 1901.

Application filed September 26, 1900. Serial No. 31,156. (No specimens.)

*To all whom it may concern:*

Be it known that I, JEAN V. SKOGLUND, a subject of the King of Sweden and Norway, and a resident of Bayonne, county of Hudson, and State of New Jersey, have invented certain new and useful Improvements in Explosive Salt Mixtures, of which the following is a specification.

The object of this invention is to make an explosive salt mixture containing a high percentage of ammonium nitrate. Such a mixture is a very desirable constituent in high explosives, especially when it can be produced at a nominal cost.

The method I use in producing the salt mixture is the following: Sodium nitrate and ammonium sulfate are dissolved in water and the solution is caused to crystallize, when sodium sulfate is separated. Only part of the sodium sulfate is thus removed, owing to the incomplete double decomposition. The crystals are separated and the mother-liquor contains salts of nitrates of ammonium and sodium and sulfates of ammonium and sodium. An oxid or a salt, preferably a nitrate, the base of which forms an insoluble or very little soluble sulfate, is now added to this mother-liquor. A sulfate is precipitated, and the clear solution consists of more or less pure nitrates of ammonium and sodium. The precipitate is separated from the clear solution, from which the water is removed either by evaporation or allowing the salts to crystallize. Some of the bases or oxids that form insoluble or difficultly-soluble sulfates are, for instance, oxids of barium and calcium.

When an oxid is used instead of a nitrate, a sulfate will be thrown down and ammonia will be liberated, which is easily removed from the solution when the water is evaporated.

The practical manner to manufacture this salt mixture is the following: About equivalent weights of commercial nitrate of sodium and ammonium sulfate are dissolved in water and the solutions are well mixed. Suspended insoluble particles are allowed to settle and the clear supernatant solution is cooled and caused to crystallize. The more dilute the solution is the purer the crystals are, which consist of Glauber's salt, and consequently the loss of the more expensive salts is less. The clear solution (the mother-liquor) is drawn off from the crystals. The crystals are a by-product and may be used for any purpose. Now I add a solution of, for instance, nitrate of calcium equivalent to the amount of sulfates in the liquor; but I may add a smaller quantity when not all of the sulfuric acid is precipitated. The precipitate is allowed to settle and the clear supernatant liquid is evaporated to dryness. The precipitated sulfate is a by-product and may be used for any purpose. The residual salt mixture is dried and ground and is now ready for any purposes it may be used for.

Instead of evaporating all water I may crystallize the mother-liquor, and thus obtain a salt mixture with a higher percentage of ammonium nitrate.

What I claim as my invention is—

The method of manufacturing a salt mixture, consisting in first dissolving sodium nitrate and ammonium sulfate in water, then causing it to crystallize, then separating the crystals from the mother-liquid, then adding a compound able to precipitate sulfuric acid as a sulfate, then separating the precipitated sulfate, and then removing the water from the mother-liquor, substantially as described.

Signed at New York city, New York, this 20th day of July, 1900.

JEAN V. SKOGLUND.

Witnesses:
C. SEDGWICK,
J. M. HOWARD.